Dec. 27, 1955  H. B. WHITE ET AL  2,728,902
APPARATUS FOR SUPERSONIC RANGING AND DETECTION
Filed Aug. 1, 1950  2 Sheets-Sheet 1

INVENTORS
HARRY B. WHITE
MAURICE D. STAHL
JACK E. DUFF
BY
Harry M. Saragovitz
ATTORNEY Dec. 27, 1955  H. B. WHITE ET AL  2,728,902
APPARATUS FOR SUPERSONIC RANGING AND DETECTION
Filed Aug. 1, 1950  2 Sheets-Sheet 2
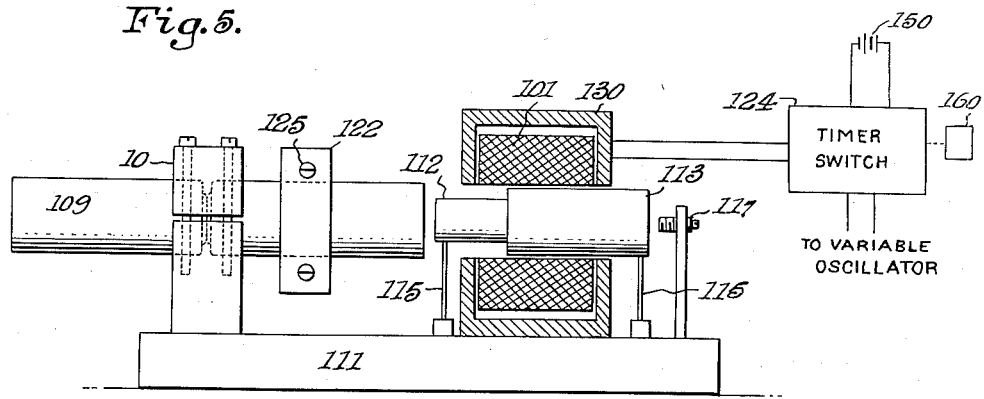
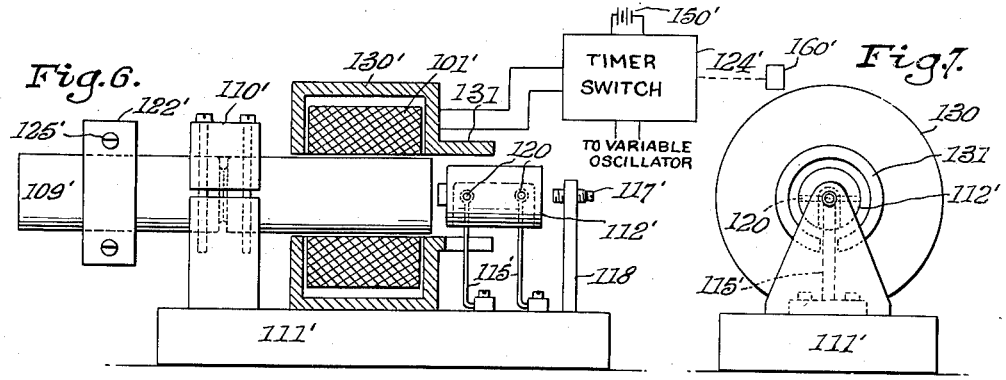
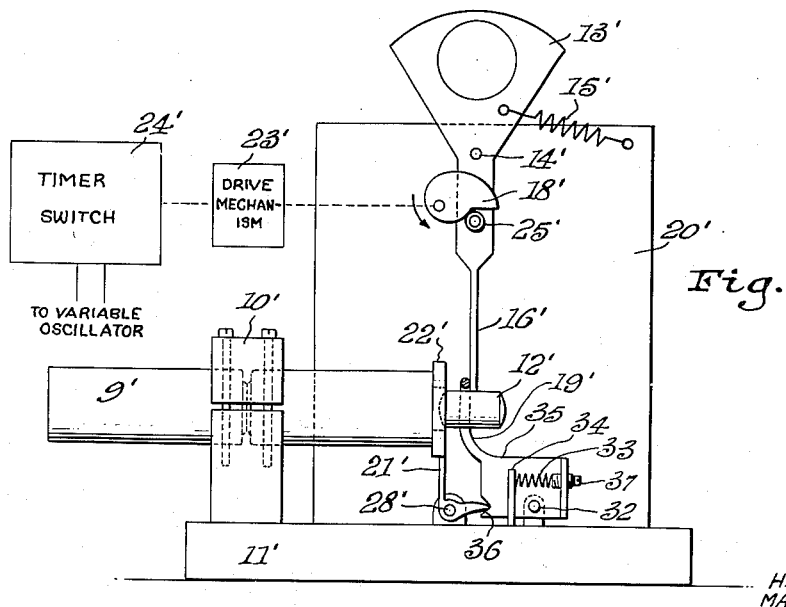
INVENTORS
HARRY B. WHITE
MAURICE D. STAHL
JACK E. DUFF
BY
Harry M. Saragovitz
ATTORNEY United States Patent Office 2,728,902
Patented Dec. 27, 1955

2,728,902

APPARATUS FOR SUPERSONIC RANGING AND DETECTION

Harry B. White, Canton, and Maurice D. Stahl and Jack E. Duff, North Canton, Ohio, assignors, by mesne assignments, to the United States of America as represented by the Secretary of the Army Application August 1, 1950, Serial No. 177,076

4 Claims. (Cl. 340—12)

This invention relates to ranging and detection of objects by supersonic pulses, and methods and apparatus for producing such pulses.

Previously, complicated, unwieldly, expensive, and delicate radar systems have been relied upon for object detection and ranging. The present invention can be substituted for such systems at short ranges. It is simple to operate, is portable, compact, made of inexpensive components and is rugged enough to withstand rough handling.

An object of this invention is to detect objects at short range.

Another object of this invention is to provide apparatus to determine the range of any object that has been detected.

A further object of this invention is to provide a rugged, compact, portable, and easily operated ranging and detection system which utilizes short pulses of supersonic energy.

A further object of this invention is to provide a ranging and detection system in which supersonic pulses are generated and transmitted, the echo pulses at one frequency being compared with variable frequency reference pulses at a second frequency to determine the range of an object.

A still further object of this invention is to provide a supersonic pulse generator.

Another object of this invention is to provide a supersonic pulse generator consisting of extremely simple, rugged and inexpensive components.

A further object of the invention is to provide a supersonic pulse generator utilizing a short metal bar which is struck at one end to cause longitudinal vibrations to be set up in the bar, the vibrations being damped so that a well defined supersonic pulse is generated.

Figure 1:
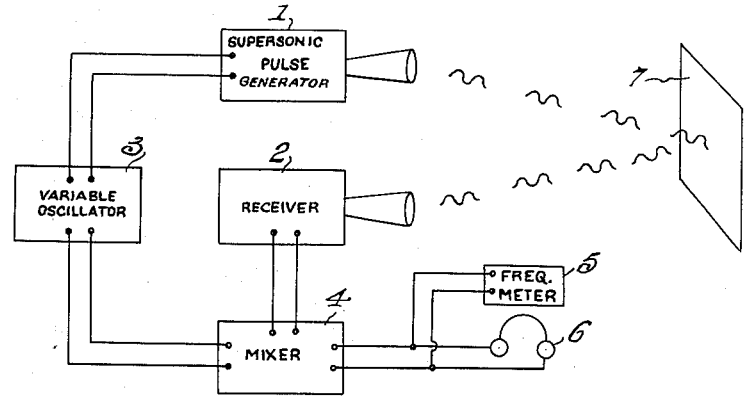
Figure 2:
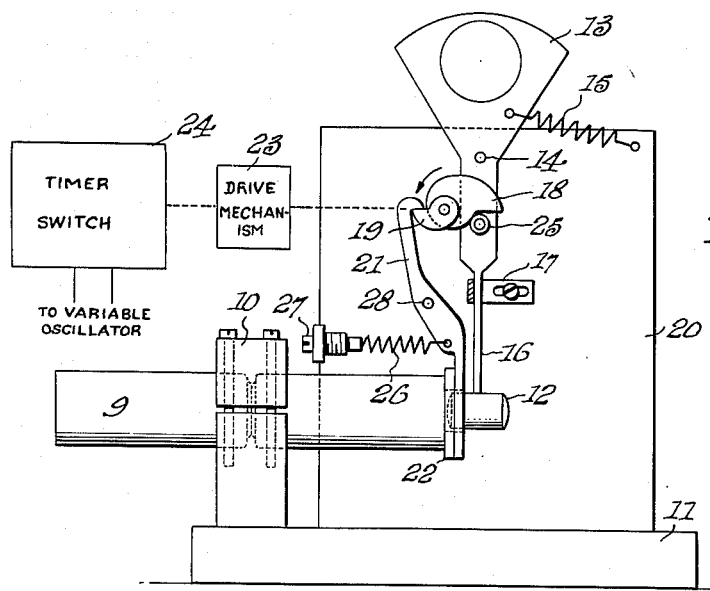
Figure 3:
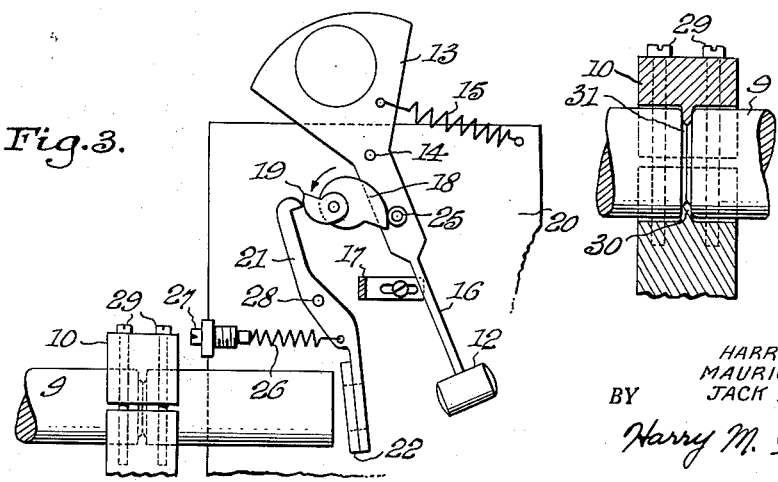
Figure 4:
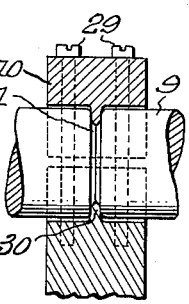

Other objects and advantages of the invention will be apparent when the following description is read in connection with the accompanying drawings in which:

Fig. 1 is a functional diagram in block form of the ranging and detection system, Fig. 2 is a front elevation of a supersonic pulse generator for use in the system of Fig. 1, Fig. 3 is a detail of the pulse generator illustrated in Fig. 2 showing the striking and damping mechanism, Fig. 4 is a detail of the pulse generator illustrated in Fig. 2 showing the manner in which the bar is supported, Figs. 5 and 6 are front elevations partly in section of two modified forms of supersonic pulse generators, Fig. 7 is a side elevation of the pulse generator illustrated in Fig. 6, Fig. 8 is a front elevation of a modification of the supersonic pulse generator shown in Fig. 2.

A system for detection and ranging of distant objects by supersonic pulses is shown in Fig. 1. An object is to be detected and the distance to the object ascertained by transmitting supersonic pulses and comparing the echo pulse received with the varying frequency of a local oscillator the oscillations of which begin at the same instant as the transmitted pulse. The pitch of the heterodyne beat frequency thus formed is a measure of the distance of the object.

Reference numeral 1 refers to a supersonic pulse generator which generates and transmits supersonic pulses at a predetermined rate. A variable frequency oscillator 3 is so connected with the supersonic pulse generator 1 that when a pulse is generated, variable oscillator 3 will be triggered. The supersonic pulses may be generated and transmitted by the pulse generator 1 at rates varying from several pulses per minute up to 20 per second, the pulse duration being measured in microseconds at its minimum value.

The variable frequency oscillator 3 is triggered into action at the same instant as pulse generator 1 and generates a reference frequency varying continuously with time, the initial frequency being of the same order as the pulse frequency. Such oscillators are well known in the art and form no part of the present invention. For instance, the variable oscillator shown in Harrison, 2,410,066, or Zapacasta, 2,461,364, could be utilized. When first triggered, oscillator 3 operates at the same frequency as supersonic generator 1. It decreases its frequency of oscillation at a predetermined rate. Thus it may start oscillating at 30 kilocycles per second, after 1 second oscillate at 29 kilocycles per second, after 2 seconds, 28 kilocycles per second, and so on for several more seconds but preferably having a shorter period of oscillation than the time between transmitted pulses.

The receiver 2 may be of the tuned microphonic type or any other suitable transducer and receives the echo pulses which are at the frequency of the supersonic generator 1. The mixer 4 is conventional and is used to heterodyne the echo pulses which are at one frequency with the reference pulses from the variable oscillator 3 which are at a second frequency.

This system is basic and as such utilizes low pulse repetition rates. In similar systems, it is often advantageous to use far higher pulse repetition rates.

The operation of the system is as follows: The transmitted pulses of supersonic energy are reflected from the object 7 and received at the receiver 2 as echo pulses. There they are transformed into electrical pulses of the same frequency and fed into the mixer 4. The echo pulses at the transmitted frequency will beat with the reference frequency fed into the mixer from the variable oscillator 3. This beat frequency output from the mixer 4 is measured by a frequency meter 5 or head phones 6. For example, if the variable oscillator decreases in frequency 1000 cycles per second, and the output of the mixer 4 is 4000 cycles per second, it will have taken the supersonic pulse energy 4 seconds to travel from the transmitter to the object to the receiver. Assuming the speed of sound in air to be 1100 feet per second, it can be seen that the object would be 2200 feet distant.

One form the supersonic pulse generator may take is shown in Figs. 2, 3, and 4. It consists of a bar 9 of metal, plastic or other suitable material, preferably cylindrical, mounted by clamping means 10 supported from a stand 11. A hammer 12 is pivoted at 14 and biased by spring 15 toward the end of bar 9. The hammer 12 is attached to the counterweight 13 by a flexible stem 16. This stem cooperates with an adjustable stop 17 so that the hammer face at rest will be a fraction of an inch from bar 9. A damper lever 21 pivoted at 28 and biased by spring 26 which is adjustable by screw 27, holds damper 22 against bar 9. The damper 22 is made from cork, felt, rubber or other suitable material and is preferably, though not necessarily, circular. The damper lever 21 and damper 22 have an opening in the middle to permit the hammer 12 to strike the bar 9. The hammer 12 and damper 22 are actuated by cams 18 and 19. A cam 18 engages detent 25 and a cam 19 engages damper lever 21. The cams are driven from a suitable driving means 23 such as an electric or spring motor.

The driving means operates a timer switch 24 which connects the pulse generator to the variable oscillator. The timer switch 24 may take the form of any well-known cam-actuated switch that can be synchronized with the striker mechanism so that each time a supersonic pulse is generated, the variable oscillator will be triggered. It does not necessarily have to be a mechanical switch since many well-known types of electronic switches may be used to perform this function. For instance, a switch similar to that disclosed in Patent 1,361,256 to Heath could be utilized.

In Fig. 4, a more detailed view of the bar mounting is shown. A groove 31 at the center or at a vibratory node of the bar 9 is engaged by a circular pointed clamp 30. Clamp rib 30 extends from the main support 10 which is formed with two segments. These are clamped together by means of screws 29, the ribs 30 being in tight fitting engagement with groove 31.

The operation of the supersonic pulse generator is as follows: The cams 18 and 19 rotate in the direction of the arrow and engage detent 25 and arm 21, respectively, as shown in Fig. 3. Cam 18 releases hammer 12 which strikes the undamped bar 9, setting up longitudinal supersonic vibrations in the bar. Immediately thereafter, cam 19 will release damper 22 which will damp the vibrations in the bar producing a well defined supersonic pulse. It can be seen that the only limit to the number of pulses generated is the inertia of the moving parts of the striker and damper mechanism.

Fig. 8 illustrates a modification of Fig. 2. In this supersonic generator, a damper 22' is operated by a lever 21' which is pivoted at 28'. This lever is actuated by plate 35 which is grooved at 36 to receive arm 21'. Plate 35 is biased by spring 33, the bias being adjusted by screw 37. The spring rests against stop 34 secured to stand 11'. Plate 35 is pivoted at 32 and arm 19' actuates plate 35.

In operation, the hammer is cocked and released by cam 18' and moves toward the end of bar 9'. Just before reaching the bar, stem 16' engages arm 19'. This causes damper 22' to leave rod 9' before hammer 12' strikes the bar. Immediately after the rod is struck, the spring 33 causes the damper to again contact the end of bar 9' to damp the vibrations therein. In this manner, supersonic pulses of definite length are generated.

Fig. 5 shows another modified supersonic wave generator. A bar 109 is supported as shown in Fig. 4. Mounted on a stand 111 is a solenoid 101. The solenoid armature 113 is connected to a non-magnetic hammer 112. This armature and hammer assembly is supported by two leaf springs 115. An adjustable stop 117 cooperates with armature 113. Mounted on the bar 109 is an adjustable damper 122 made of vibrational absorptive material. This damper may be moved from the center to the end of the bar and the pressure it exerts on the bar may be controlled by the screws 125.

A timer 124 may be similar to the timer 24. As mentioned above, it may take the form of the timer switch disclosed in Patent 1,361,256 to Heath. The timer 124 is driven by motor 160. The battery 150 is connected through the timer switch to both the solenoid 101 and the variable oscillator.

The operation of the generator is as follows: The timer switch 124 is closed energizing the solenoid 101 from battery 150. The hammer 112 strikes the bar 109 producing longitudinal supersonic vibrations in the bar. By means of damper 122, the vibrations in the bar are damped and a definite pulse generated that can be used in the detection and ranging system. The pulse repetition rate is controlled by the speed of the motor 160 driving the timer switch 124 when the mechanical timer switch is used. This embodiment of the invention has fewer moving parts than the pulse generators illustrated in Figs. 2 and 8 and therefore the overall inertia is less, allowing a greater pulse repetition rate.

Fig. 6 shows a modification of Fig. 5. In order to make the unit smaller, the solenoid is placed around the bar 109'. The bar in this instance must be of some magnetic material and is utilized in the magnetic circuit of the solenoid. The armature 112' is supported by two leaf springs 115'. These springs are connected by pivots 120 to the armature 112' of the solenoid 101'. This arrangement permits a freely movable armature. In this modification, armature 112' is utilized as a hammer. The operation of this supersonic generator is the same as that of the embodiment shown in Fig. 5.

While the foregoing description assumed the operation of the invention in air, other media such as water may be utilized.

Many modifications may be made within the scope of the invention by those skilled in the art and therefore, the invention is not limited by the particular description above but only by the appended claims.

We claim:

1. A supersonic pulse generator adapted to generate constant frequency pulse wave trains with relatively long silent intervals therebetween including, a metal bar, a hammer, and means for periodically striking the end of said bar axially with said hammer setting up longitudinal vibrations therein, means for supporting the bar at a vibrational node including a circumscribing groove on the surface of the bar at said node and opposed semi-circular members having V-shaped ribs tightly fitting in said groove, and damping means applied to the bar shortly after being struck to damp out said vibrations forming thereby well defined pulses of substantially constant amplitude.

2. A supersonic pulse generator comprising a bar, clamp means supporting said bar at a vibrational node including opposed semi-circular members having V-shaped inwardly projecting ribs in tight fitting engagement with the surface of said bar, means to repeatedly strike said bar axially at one end thereof to generate longitudinal supersonic vibrations therein and damping means acting on the end of said bar to damp out said vibrations so that well defined supersonic pulses are generated, said damping means including vibrational absorptive material.

3. A supersonic pulse generator comprising a bar, a hammer, means to periodically strike said bar axially on one end thereof to generate longitudinal supersonic vibrations therein, means for supporting the bar at a vibrational node including a circumferential groove at said node and clamping means having V-shaped inwardly projecting ribs tightly fitting said groove, means responsive to said striking means for periodically damping said vibrations generated in said bar a predetermined short interval after said hammer strikes said bar whereby well defined supersonic pulses are generated.

4. A supersonic pulse generator comprising, a bar of elastic material having a vibrational node substantially at its mid-point and having a length substantially a half wavelength for the natural frequency of longitudinal vibration, means for supporting the bar including lateral grooves on opposite sides at said nodal point and fixed members having V-shaped ribs tightly engaging the bar in said grooves, and a concussive device adapted to periodically set said bar into longitudinal vibration.

References Cited in the file of this patent

UNITED STATES PATENTS

| | | |
|---|---|---|
| 1,858,931 | Langevin et al. | May 7, 1932 |
| 2,016,907 | Rice | Oct. 8, 1935 |
| 2,033,160 | Turner | Mar. 10, 1936 |
| 2,233,992 | Wyckoff | Mar. 4, 1941 |

(Other references on following page)

UNITED STATES PATENTS

| | | |
|---|---|---|
| 2,371,988 | Granquist | Mar. 20, 1945 |
| 2,405,182 | Bollman | Aug. 6, 1946 |
| 2,433,361 | Harrison | Dec. 30, 1947 |
| 2,498,990 | Fryklund | Feb. 28, 1950 |
| 2,507,746 | Wright | May 16, 1950 |
| 2,571,409 | Beyers | Oct. 16, 1951 |

OTHER REFERENCES

"Ultrasonic Propagation in Open Air"—article in Journal of the Acoustic Society of America, vol. 19, #1 (January 1947).